United States Patent
Zhang et al.

(10) Patent No.: US 11,435,926 B2
(45) Date of Patent: Sep. 6, 2022

(54) METHOD, DEVICE, AND COMPUTER PROGRAM PRODUCT FOR MANAGING STORAGE SYSTEM

(71) Applicant: EMC IP Holding Company LLC, Hopkinton, MA (US)

(72) Inventors: Alex Pengbo Zhang, Shanghai (CN); You Chen, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/005,215

(22) Filed: Aug. 27, 2020

(65) Prior Publication Data
US 2021/0405904 A1 Dec. 30, 2021

(30) Foreign Application Priority Data
Jun. 29, 2020 (CN) .......................... 202010609010.0

(51) Int. Cl.
*G06F 3/06* (2006.01)
*G06F 16/901* (2019.01)

(52) U.S. Cl.
CPC .......... *G06F 3/0644* (2013.01); *G06F 3/0604* (2013.01); *G06F 3/0683* (2013.01); *G06F 16/901* (2019.01)

(58) Field of Classification Search
CPC .... G06F 3/0644; G06F 3/0604; G06F 3/0683; G06F 16/901
See application file for complete search history.

(56) References Cited

U.S. PATENT DOCUMENTS

| | | | | |
|---|---|---|---|---|
| 7,647,329 B1* | 1/2010 | Fischman | ............. | G06F 3/0607 707/999.1 |
| 2007/0156842 A1* | 7/2007 | Vermeulen | .......... | H04L 67/1097 709/217 |
| 2008/0155229 A1* | 6/2008 | Beyer | ..................... | G06F 17/10 711/216 |
| 2012/0310960 A1* | 12/2012 | Watanabe | ............. | G06F 16/901 707/756 |
| 2013/0031229 A1* | 1/2013 | Shiga | .................. | G06F 16/2471 709/223 |
| 2013/0297788 A1* | 11/2013 | Itoh | ..................... | H04L 43/0876 709/224 |
| 2017/0235775 A1* | 8/2017 | McKenna | ............... | G06F 16/22 707/741 |

(Continued)

*Primary Examiner* — Ryan Bertram
(74) *Attorney, Agent, or Firm* — Amin, Turocy & Watson, LLP

(57) ABSTRACT

To manage a storage system, data objects are divided to groups according to keyword ranges of the data objects in the storage system. Array sets associated with the groups are respectively generated. An array in the array set includes elements. The elements are set according to a keyword of at least one data object in the group and at least one hash function. At least a part of the arrays in the array sets respectively associated with the groups is loaded into a memory of the storage system. The storage system is managed based on at least the part of the arrays in the memory. Further, a corresponding device and a corresponding computer program product are provided. With the above example implementation, only a part of the arrays is loaded into the memory of the storage system, so that the overhead of memory resources can be reduced.

20 Claims, 10 Drawing Sheets

(56) References Cited

U.S. PATENT DOCUMENTS

| | | | |
|---|---|---|---|
| 2018/0081585 A1* | 3/2018 | Piga | G06F 3/0647 |
| 2018/0232310 A1* | 8/2018 | Chang | G06F 12/0895 |
| 2020/0233801 A1* | 7/2020 | Gupta | G06F 7/36 |
| 2020/0333968 A1* | 10/2020 | Bortnikov | G06F 3/0638 |
| 2020/0341889 A1* | 10/2020 | Idreos | G06F 16/2246 |
| 2021/0173581 A1* | 6/2021 | Uno | G06F 3/0652 |
| 2021/0232501 A1* | 7/2021 | Na | G06F 12/0815 |

* cited by examiner

METHOD, DEVICE, AND COMPUTER PROGRAM PRODUCT FOR MANAGING STORAGE SYSTEM

RELATED APPLICATION

The present application claims the benefit of priority to Chinese Patent Application No. 202010609010.0, filed on Jun. 29, 2020, which application is hereby incorporated into the present application by reference herein in its entirety.

TECHNICAL FIELD

Implementations of the present disclosure relate to storage management, and more particularly, to a method, a device, and a computer program product for managing data objects in a storage system.

BACKGROUND

With the development of data storage technologies, various data storage devices have been capable of providing users with higher and higher data storage capacities. At present, a technical solution of providing a bloom filter in a storage system has been proposed. In this technical solution, one or more elements in the bloom filter may indicate whether a certain data object exists in the storage system. As the number of data objects in the storage system continues to increase, in order to avoid hash collisions, the length of the bloom filter also increases and a larger internal memory space in the storage system needs to be occupied. At this moment, how to reduce the space overhead of a memory of the bloom filter has become a research hot spot.

SUMMARY

Therefore, it is desirable to develop and implement a technical solution for managing a storage system in a more effective manner. It is desirable that the technical solution is compatible with existing storage systems, and by modifying various configurations of the existing storage systems, a storage system may be managed in a more effective way.

According to a first aspect of the present disclosure, a method for managing a storage system is provided. In this method, a plurality of data objects are divided to a plurality of groups according to keyword ranges of the plurality of data objects in the storage system. Array sets associated with groups in the plurality of groups are respectively generated. An array in the array set includes a plurality of elements. Here, the plurality of elements are set according to a keyword of at least one data object in the group and at least one hash function. At least a part of the arrays in the plurality of array sets respectively associated with the plurality of groups is loaded into a memory of the storage system. The storage system is managed based on at least a part of the arrays in the memory.

According to a second aspect of the present disclosure, an electronic device is provided. The electronic device includes: at least one processor; a volatile memory; and a memory coupled to the at least one processor. The memory has instructions stored therein. When executed by the at least one processor, the instructions cause the device to execute operations for managing a storage system. The operations include: dividing a plurality of data objects to a plurality of groups according to keyword ranges of the plurality of data objects in the storage system; generating array sets associated with groups in the plurality of groups respectively, an array in the array set including a plurality of elements, the plurality of elements being set according to a keyword of at least one data object in the group and at least one hash function; loading at least a part of the arrays in the plurality of array sets respectively associated with the plurality of groups into a memory of the storage system; and managing the storage system based on at least a part of the arrays in the memory.

According to a third aspect of the present disclosure, a computer program product is provided. The computer program product is tangibly stored on a non-transitory computer-readable medium and includes machine-executable instructions that are used to implement the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of example rather than limitation. In the accompanying drawings.

DETAILED DESCRIPTION

Hereinafter, preferred implementations of the present disclosure will be described in more detail with reference to the accompanying drawings. Although preferred implementations of the present disclosure are shown in the accompanying drawings, it should be understood that the present disclosure can be implemented in various forms and should not be limited by the implementations set forth herein. Rather, these implementations are provided so that the present disclosure will be more thorough and complete, and the scope of the present disclosure will be fully conveyed to those skilled in the art.

As used herein, the term "include" and variations thereof mean open-ended inclusion, that is, "including but not limited to." Unless specifically stated, the term "or" indicates "and/or." The term "based on" means "based at least in part on." The terms "one example implementation" and "one implementation" mean "at least one example implementation." The term "another implementation" means "at least one further implementation." The terms "first," "second," etc. may refer to different or the same objects. Other explicit and implicit definitions may also be included below.

Figure 1:
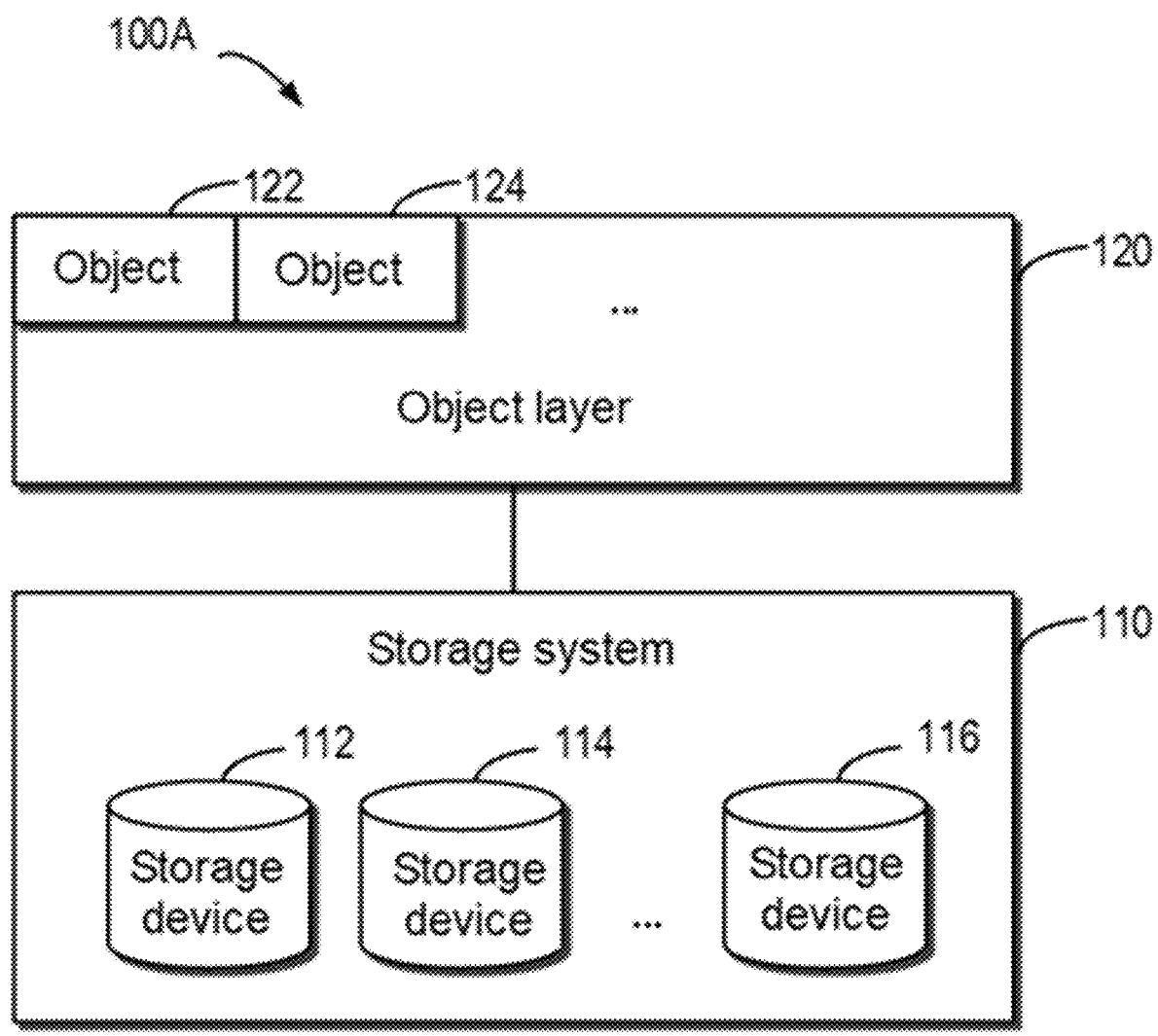
FIG. 1 schematically shows a schematic diagram of a storage system in which a method of the present disclosure may be implemented.

Various storage systems have been developed at present. Specifically, FIG. 1 schematically shows block diagram 100 of a storage system in which a method of the present disclosure may be implemented. As shown in FIG. 1, storage system 110 may be provided, and storage system 110 may include a plurality of storage devices 112, 114, . . . , 116. Although a plurality of independent physical storage devices 112, 114, . . . , 116 are shown here, the storage devices may also include virtual storage devices according to example implementations of the present disclosure. Alternatively and/or additionally, storage system 110 here may be a storage system including a single storage device.

Figure 2:
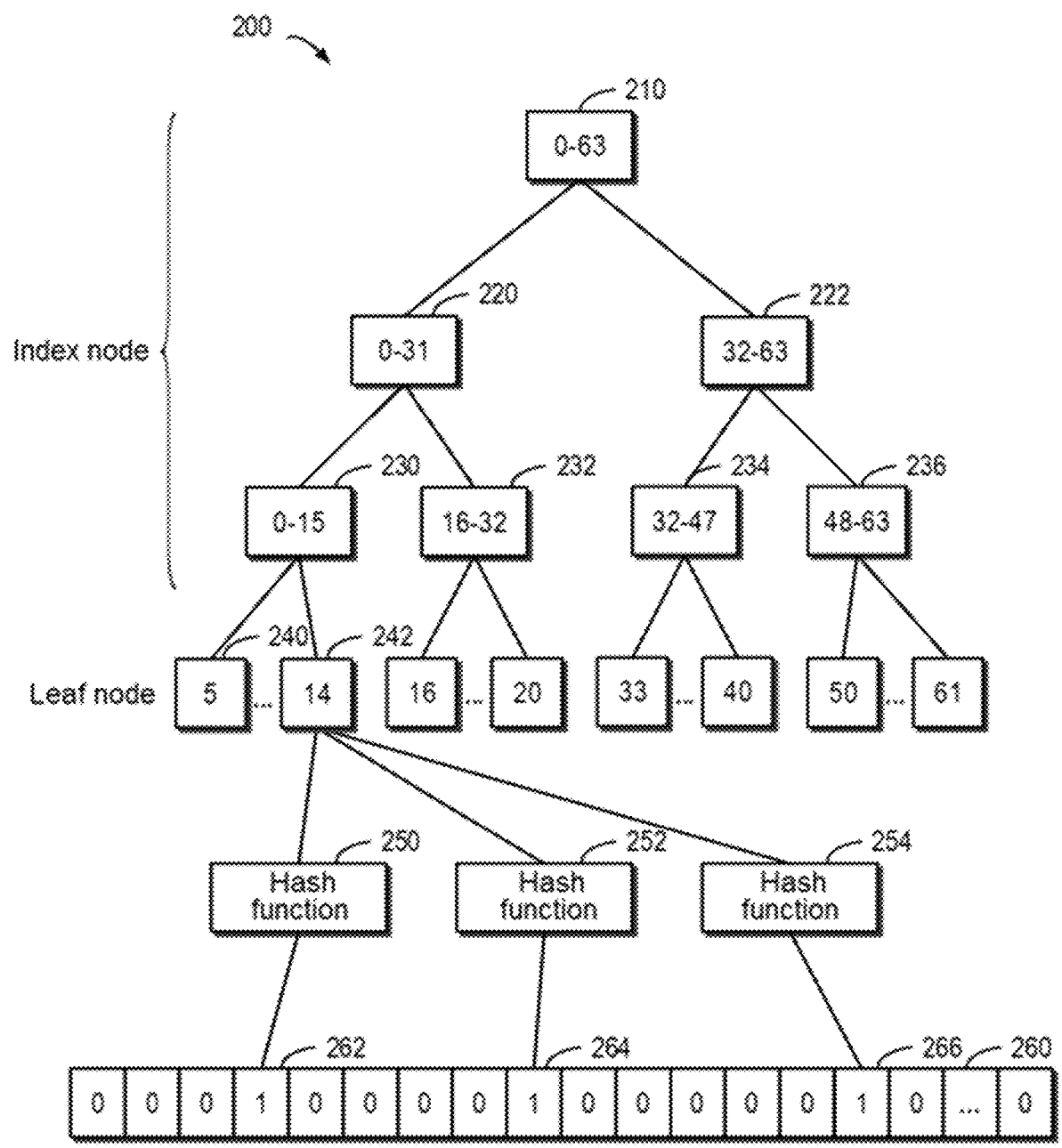
FIG. 2 schematically shows a block diagram of indexes of a storage system according to a technical solution.

Object layer 120 may be established over storage system 110, and object layer 120 is visible to users of storage system 110. Object layer 120 may include a plurality of objects 122, 124, etc. from users. In order to facilitate the management of individual objects, indexes may be established for a plurality of objects. Hereinafter, more details about the indexes will be described with reference to FIG. 2. FIG. 2 schematically shows block diagram 200 of indexes of storage system 110 according to a technical solution. As shown in FIG. 2, the indexes may be represented in a tree structure, and a plurality of data objects are managed based on keywords of the plurality of data objects. Specifically, the indexes may include a plurality of hierarchies, for example, may take the form of a binary tree. At this moment, each non-leaf node of the binary tree represents an index node, and each index node may be related to a predetermined keyword range of the data object.

The keywords of a plurality of data objects in storage system 110 may be mapped to a predetermined range via a hash function. All data objects may be mapped to a range of 0 to 63. Then at this moment, as shown in FIG. 2, a range corresponding to a root node is 0 to 63. Root node 210 may include two child nodes 220 and 222. At this moment, the range of a child node may be a part of the range of a parent node. For example, child node 220 corresponds to a range of 0 to 31, and child node 222 corresponds to a range of 32 to 63. Similarly, child nodes 230, 232, 234, and 236 may correspond to respective ranges.

Child node 230 may include leaf nodes 240 and 242. Here, the leaf node may store metadata of an object in a key-value form. The key represents a keyword of the object, and the value represents the metadata of the object. Here, the metadata may include, for example, an address of each block included in the object, a type of the object, an update time of the object, and the like. The metadata may be used to find a corresponding data object.

It will be understood that although only indexes in the form of a binary tree are shown schematically in FIG. 2, the indexes may also take other forms according to an example implementation of the present disclosure. For example, the indexes may be stored using a multi-way tree, a B+ tree, or other manners. Although only the case where the indexes include three hierarchies of non-leaf nodes is schematically shown in FIG. 2, the indexes may also include more or fewer hierarchies according to an example implementation of the present disclosure.

It will be understood that although the concept of the indexes have been described above by taking the indexes of storage system 110 as an example, as the number of data objects in storage system 110 increases, the storage system may also be divided into a plurality of partitions, and indexes as shown in FIG. 2 may be set for data objects in each partition.

At present, it has been proposed that the data objects in storage system 110 are managed based on a bloom filter. The bloom filter may include one or more hash functions and an array of a predetermined length. As shown in FIG. 2, bloom filter 260 may include hash functions 250, 252, and 254. And the array may include a plurality of "bits." The hash function may map a keyword of a data object to a certain bit in bloom filter 260, and a mark (for example, 1) may be set for the bit to indicate that the storage system includes the data object. The plurality of data objects in the storage system may be mapped to corresponding bits in bloom filter 260, respectively.

If it is desired to determine whether a certain target data object exists in the storage system, a bit corresponding to a keyword of the target data object may be determined based on the hash function, and it is checked whether the bit is marked. If the bit is not marked, it indicates that the target data object is not in the storage system. The hash function may face a hash collision, so if the bit is marked, it indicates that the target data object may be in the storage system, but it does not guarantee that the target data object is definitely in the storage system. The above phenomenon may be referred to as a "false positive rate" of bloom filtering. In order to reduce the false positive rate, a plurality of hash functions may be set. If any one of a plurality of bits corresponding to the plurality of hash functions respectively is not marked, it indicates that the target data object is not in the storage system.

With continued reference to FIG. 2, the keywords of the data object shown at leaf node 242 may be processed using hash functions 250, 252, and 254, respectively. At this moment, bits 262, 264, and 266 in bloom filter 260 are set to 1, respectively. When it is desired to search to see whether the data object represented by leaf node 242 exists in storage system 110, hash functions 250, 252, and 254 may be used to process the keywords in order to find bits 262, 264, and 266. If any one of the three bits is set to 0, it indicates that the data object is not in storage system 110. If the three bits are all set to 1, it indicates that the data object may exist in storage system 110.

As the number of data objects included in storage system 110 increases, bloom filter 260 needs to be extended to a greater length in order to reduce the false positive rate. However, during the operation of the storage system, bloom filter 260 needs to be loaded into a memory (i.e., internal memory) of storage system 110, which will result in a larger memory resource overhead. Therefore, how to reduce the memory resource overhead caused by bloom filter 260 has become a research hot spot.

In order to solve the above defects, implementations of the present disclosure provide a method, a device, and a computer program product for managing a storage system. According to an example implementation of the present disclosure, it is proposed that a plurality of data objects in a storage system are divided to groups according to keyword ranges of the plurality of data objects in the storage system.

Then, an array set may be set for each group. Here, the array set may include a plurality of bloom filters having a smaller length. If data objects in a certain group are accessed frequently, a larger number of arrays in an array set of the group may be loaded into the memory of the storage system. If data objects in a certain group are rarely accessed, a smaller number of arrays in an array set of the group may be loaded into the memory of the storage system. Further, the storage system may be managed based on one or more arrays in the memory.

With an example implementation of the present disclosure, it is not necessary to load all array sets into the memory of the storage system, and in most cases, only a part of them has to be loaded. In this way, the memory resource requirements caused by the bloom filter can be reduced, thereby reducing the workload of the entire storage system.

Figure 3:
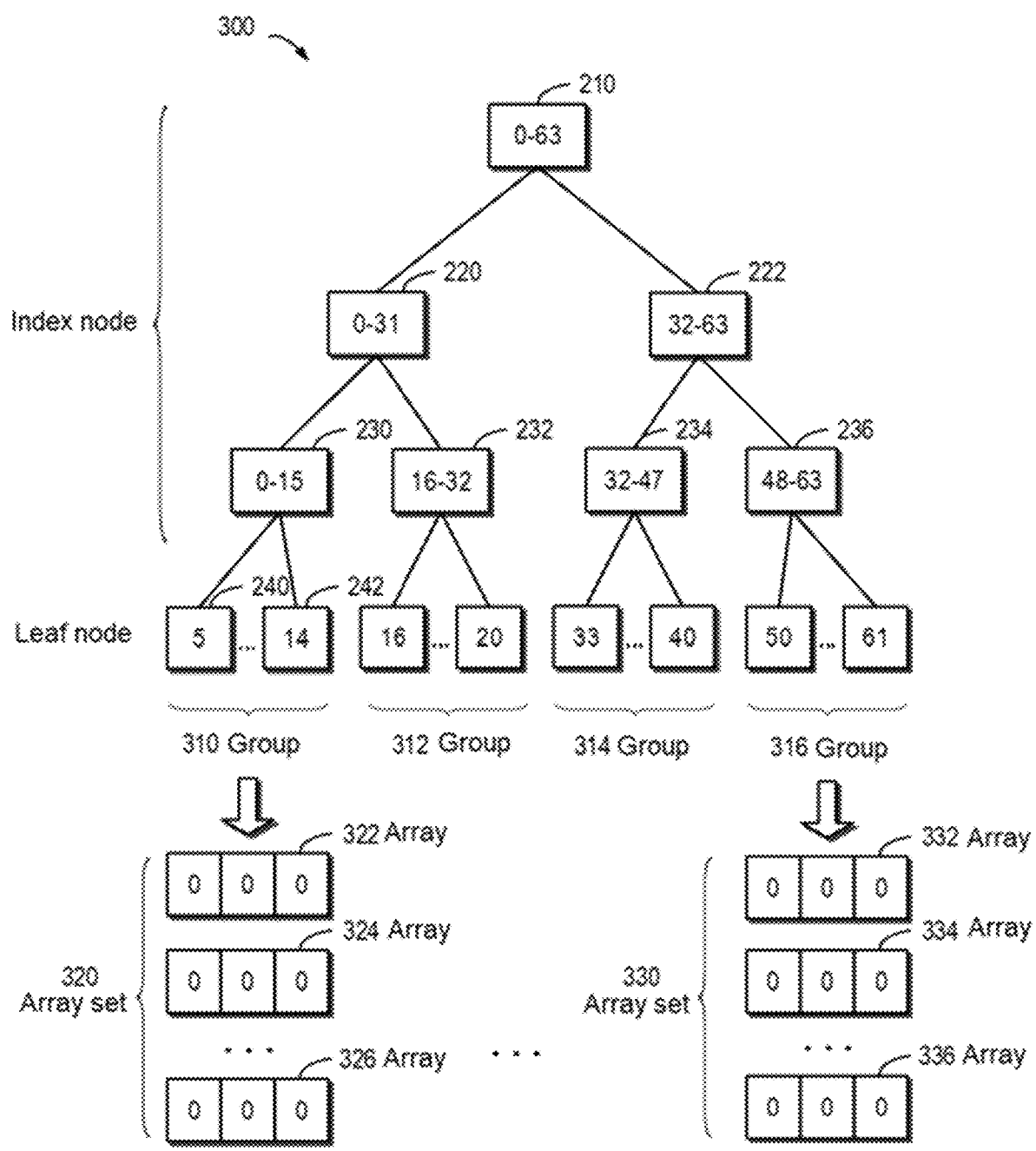
FIG. 3 schematically shows a block diagram of a process for managing a storage system according to an implementation of the present disclosure.

Hereinafter, an overview of an example implementation according to the present disclosure will be described with reference to FIG. 3. FIG. 3 schematically shows block diagram 300 of a process for managing a storage system according to an implementation of the present disclosure. As shown in FIG. 3, a plurality of data objects may be divided to groups according to keyword ranges of the plurality of data objects. For example, keywords of data objects in group 310 are in a range of 0 to 15, keywords of data objects in group 312 are in a range of 16 to 32, keywords of data objects in group 314 are in a range of 32 to 47, and keywords of data objects in group 316 are in a range of 48 to 63.

Then, an array set may be set for each group. For example, array set 320 may be set for group 310, and array set 320 may include arrays 322, 324, . . . , 326. For another example, array set 330 may be set for group 316, and array set 330 may include arrays 332, 334, . . . , 336. Here, the number of arrays to be loaded into the memory may be determined according to an access popularity of the data objects in the groups. It will be understood that although FIG. 3 only schematically shows array sets 320 and 330 of groups 310 and 316, array sets may be set for groups 312 and 314 in a similar manner. Further, the storage system may be managed based on one or more arrays in the memory.

Figure 4:
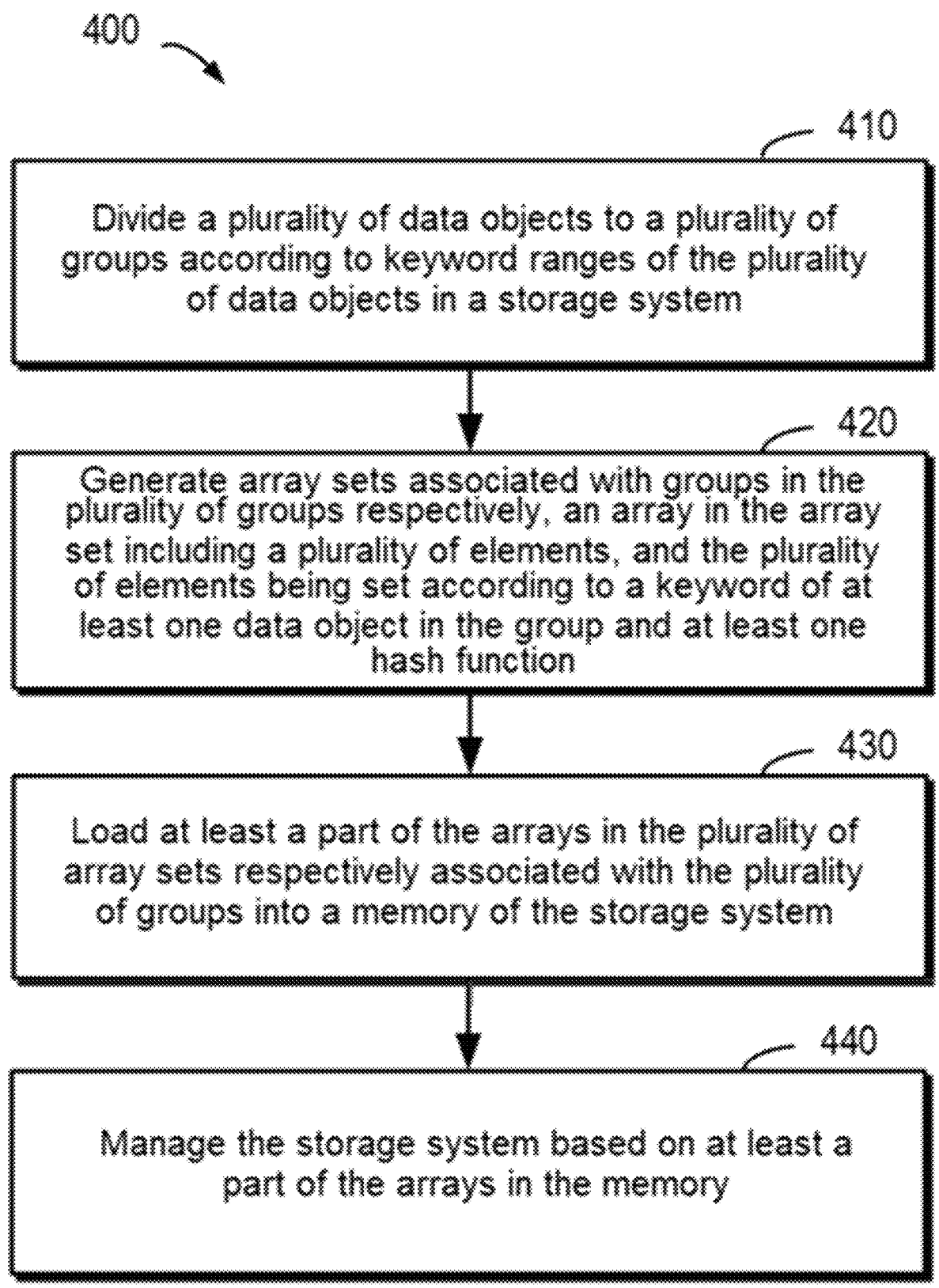
FIG. 4 schematically shows a flow chart of a method for managing a storage system according to an implementation of the present disclosure.

Hereinafter, more details of an example implementation according to the present disclosure will be described with reference to FIG. 4. FIG. 4 schematically shows a flow chart of method 400 for managing a storage system according to an implementation of the present disclosure. At block 410, a plurality of data objects are divided to a plurality of groups according to keyword ranges of the plurality of data objects in storage system 110. According to an example implementation of the present disclosure, a plurality of groups may be determined in various ways. For example, indexes corresponding to the plurality of data objects in the storage system may be acquired, and a group may be obtained using the indexes.

The indexes here may include the indexes shown in FIGS. 2 and 3. It will be understood that in different hierarchies of the indexes, index nodes may correspond to different keyword ranges. Therefore, a plurality of data objects may be divided to a plurality of groups based on a hierarchical structure of the indexes. Specifically, a plurality of groups may be determined based on non-leaf nodes in the indexes. According to an example implementation of the present disclosure, a plurality of data objects may be divided into four groups based on nodes 230, 232, 234, and 236. According to another example implementation of the present disclosure, a plurality of data objects may be divided into two groups based on nodes 220 and 222. According to an example implementation of the present disclosure, when the indexes have other hierarchical structures, a plurality of data objects may also be divided into different numbers of groups.

With the example implementation of the present disclosure, a plurality of groups may be determined based on keyword ranges of a plurality of data objects represented in existing indexes. At this moment, there is no additional resource overhead due to the division of groups, but existing data in the storage system may be reused as much as possible.

At block 420, array sets associated with groups in the plurality of groups are respectively generated. An array in the array set includes a plurality of elements. It should be understood that the plurality of elements here are set according to a keyword of at least one data object in the group and at least one hash function. According to an example implementation of the present disclosure, the array is represented by a bloom filter, and at this moment, the elements in the array are bits in the bloom filter. With the example implementation of the present disclosure, the keywords of each data object may be processed one by one based on the hash function to mark the corresponding bits for each data object. In this way, an array structure may be easily established for use in managing a plurality of data objects.

An array set is set for each group, and each array in the array set may be operated independently. If only a single array is used, the single array may indicate whether a certain data object is included in the storage system, but the false positive rate of the single array may be relatively high. A plurality of arrays may be used in combination, and the false positive rate in the result at this moment will be reduced. With respect to the existing technical solution that uses a longer array to store the bloom filter and load the entire array into the memory, with the example implementation of the present disclosure, a plurality of arrays with smaller lengths may be set for each group respectively. In this way, a part of the plurality of arrays may be selected to be loaded into the memory in order to reduce the memory resource overhead of storage system 110.

According to an example implementation of the present disclosure, an original length of an original bloom filter associated with storage system 110 may be determined. The original bloom filter here refers to a bloom filter established using an existing technical solution. The total storage space occupied by all the arrays in the plurality of array sets may be determined based on the original length. Further, the length and number of the plurality of arrays according to an example implementation of the present disclosure may be determined based on the original length and the number of groups. With the example implementation of the present disclosure, it can be ensured that the space of all bloom filters set for storage system 110 is not larger than an original space of the original bloom filter. During the operation of storage system 110, only a part of the arrays needs to be loaded, and an effect similar to that of loading the entire original bloom filter in the existing technical solution may be obtained.

Specifically, assuming that the length of bloom filter 260 shown in FIG. 2 is 18 bits and it has been determined that a plurality of data objects are divided into two groups, a storage space of 18/2=9 bits may be assigned for each group at this moment. In an example, three arrays may be set for each group. At this moment, each array will include a storage space of 9/3=3 bits. For another example, assuming that the length of bloom filter 260 shown in FIG. 2 is 32 bits and it has been determined that a plurality of data objects are divided into two groups, a storage space of 32/2=16 bits may be assigned for each group at this moment. In an example, four arrays may be set for each group. At this moment, each array will include a storage space of 16/4=4 bits.

It will be understood that the above number and length of the arrays are only schematic. According to an example implementation of the present disclosure, array sets of two groups may include the same or different numbers of arrays, and the lengths of arrays included in the two array sets may be the same or different. According to an example implementation of the present disclosure, the number of hash functions may be set as desired. For example, one or more hash functions may be used for each array. Hereinafter, referring to FIG. 5, it will be described how to set elements corresponding to data objects in an array.

Figure 5:
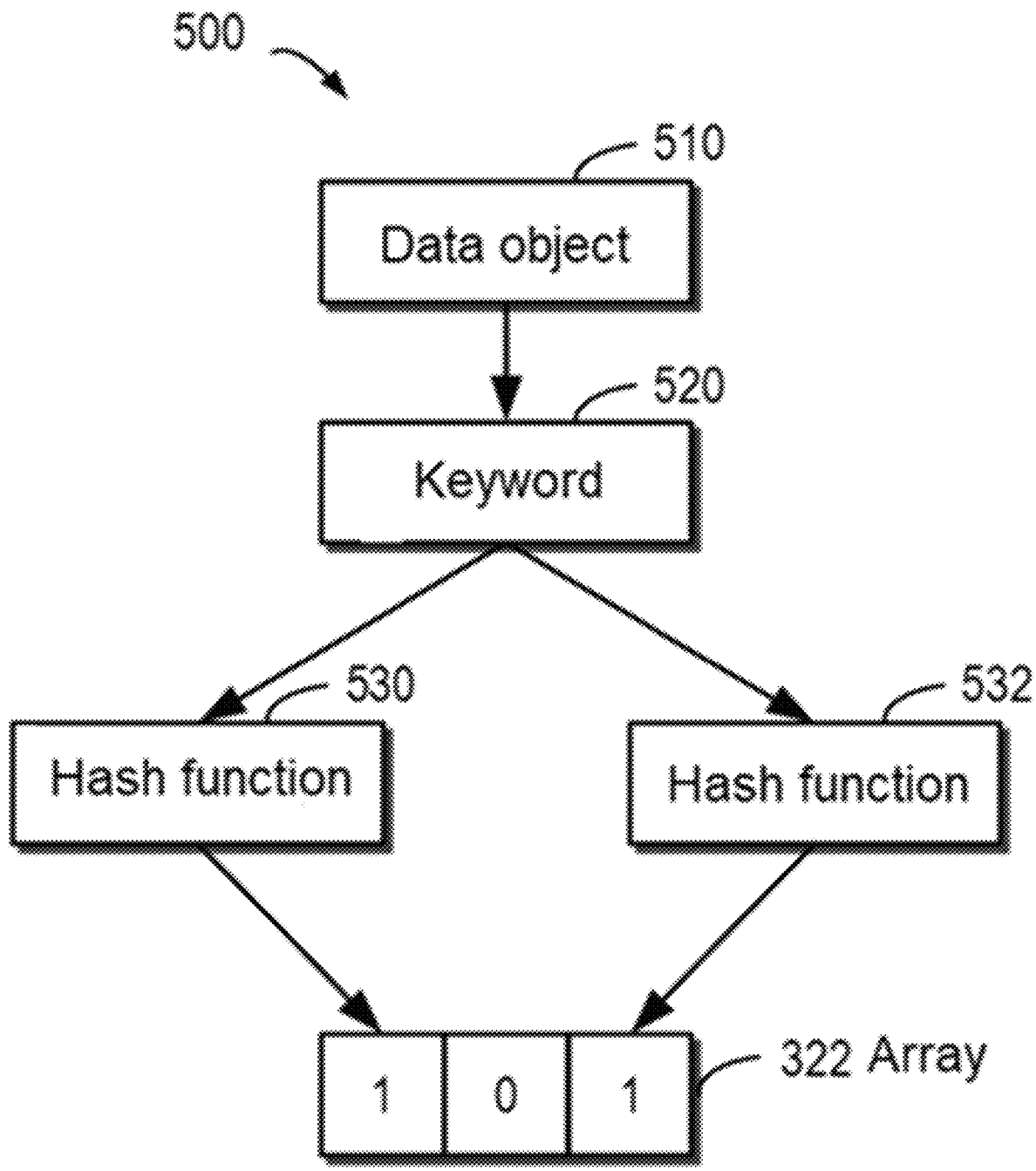
FIG. 5 schematically shows a block diagram of a process for determining a bloom filter value of a data object according to an implementation of the present disclosure.

FIG. 5 schematically shows block diagram 500 of a process for determining a bloom filter value of a data object according to an implementation of the present disclosure. The figure shows that elements in array 322 are set for data object 510 in group 310. As shown in FIG. 5, data object 510 may be acquired, and keyword 520 of data object 510 may be determined. Then, the elements in the array may be set based on one or more hash functions. Assuming that two hash functions 530 and 532 are used, an element corresponding to keyword 520 may be determined as a first element in array 322 based on hash function 530. Then, the first element in array 322 may be set to 1. An element corresponding to keyword 520 may be determined as a third element in array 322 based on hash function 532. Then, the third element in array 322 may be set to 1. At this moment, the third element in array 322 may be set to "101."

According to an example implementation of the present disclosure, marks corresponding to other data objects may be provided in array 322 based on a similar manner, and a mark corresponding to each data object in group 310 may be provided in other arrays based on a similar manner.

The above has described how to generate an array set associated with each group with reference to FIG. 5. Hereinafter, more details about loading the array set will be described by returning to FIG. 4. At block 430 of FIG. 4, at least a part of the arrays in the plurality of array sets associated with the plurality of groups is loaded into a memory of storage system 110. With the example implementation of the present disclosure, a storage space occupied by the arrays loaded into the memory may be reduced, thereby reducing the usage load of the memory of storage system 110.

According to an example implementation of the present disclosure, for a given group in the plurality of groups, an access popularity of at least one data object in the given group may be determined. For example, the popularity here may be represented by a frequency of data objects in the given group being accessed. At least a part of the arrays in the array set associated with the given group may be loaded into the memory based on the popularity. Hereinafter, more details about loading the array will be described with reference to FIG. 6.

Figure 6:
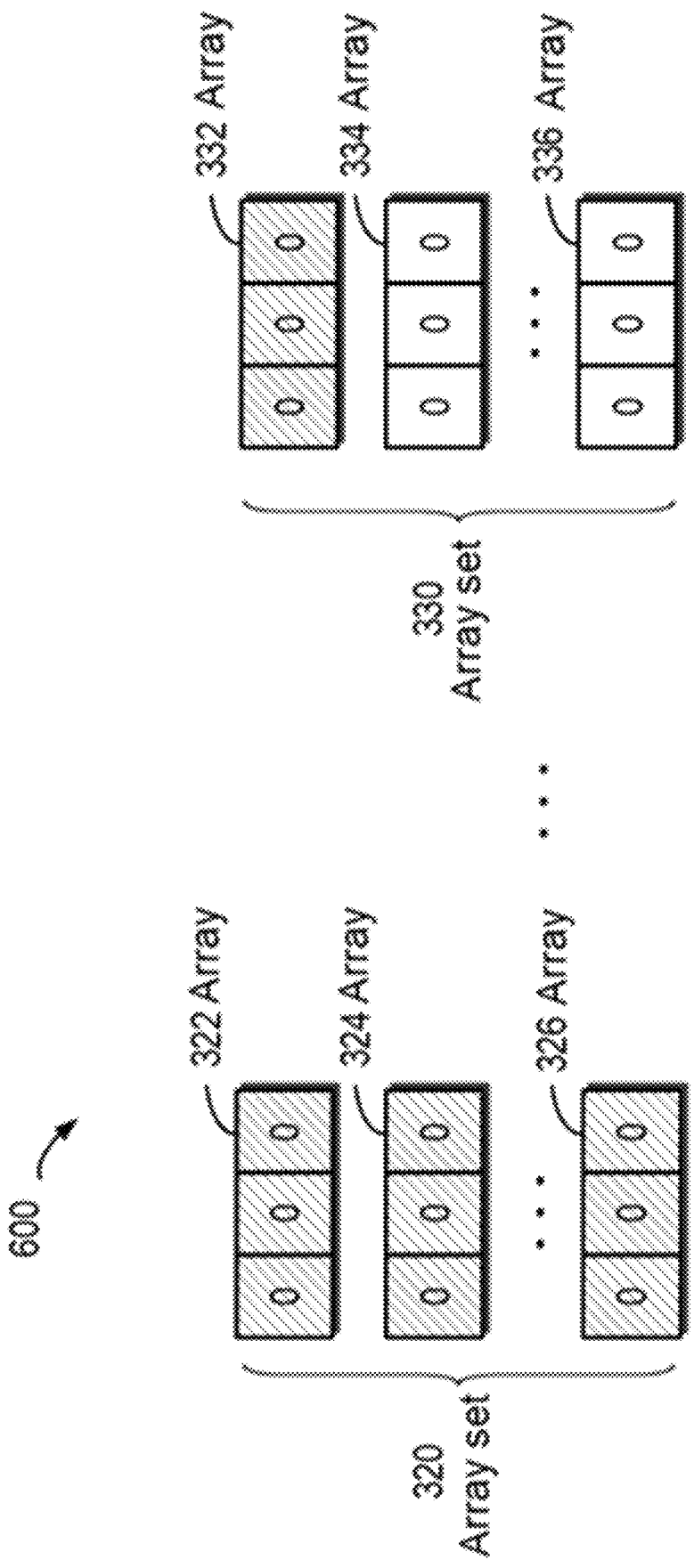
FIG. 6 schematically shows a block diagram of a process for loading at least a part of arrays in a plurality of array sets to a memory according to an implementation of the present disclosure.

FIG. 6 schematically shows block diagram 600 of a process for loading at least a part of arrays in a plurality of array sets to a memory according to an implementation of the present disclosure. Array sets 320 and 330 are created for groups 310 and 316, respectively. Assuming that data objects in group 310 are accessed frequently, all (or most of) arrays 322, 324, . . . , 326 may be loaded into the memory. Assuming that data objects in group 316 are rarely accessed, only array 332 may be loaded into the memory.

With the example implementation of the present disclosure, more arrays in the array sets of the groups accessed frequently in storage system 110 may be loaded into the memory. In this way, the plurality of arrays that have been loaded into the memory may be accessed quickly to determine information related to a certain data object, thereby increasing the response speed, reducing the false positive rate, and improving the accuracy of determination results.

Hereinafter, the false positive rates of the existing technical solution and of an example implementation according to the present disclosure will be compared. First, the false positive rate of the original bloom filter based on the existing technical solution is described. It is assumed that the original bloom filter includes b bits, the false positive rate of each array may be represented as $(1-e^{-k/b})^k$, where k represents the number of hash functions, and b is the length of the bloom filter. When $k=\ln 2 \cdot b$, the false positive rate will be minimized. The value may be represented as $0.6185^b$. According to an example implementation of the present disclosure, if x smaller bloom filters are used, each smaller bloom filter will include b/x bits. Since all the hash functions are independent of each other, x the false positive rates of all the smaller bloom filters may be represented as $(0.6185^{b/x})^x$, the value is equal to the false positive rate of the original bloom filter with a length of b. Therefore, with the example implementation of the present disclosure, the generated false positive rate is the same as that of the existing technical solution. However, since only a part of the bloom filters, rather than all the bloom filters, needs to be loaded into the memory, the resource overhead of the memory in storage system 110 may be reduced, thereby reducing the workload of storage system 110.

Figure 7:
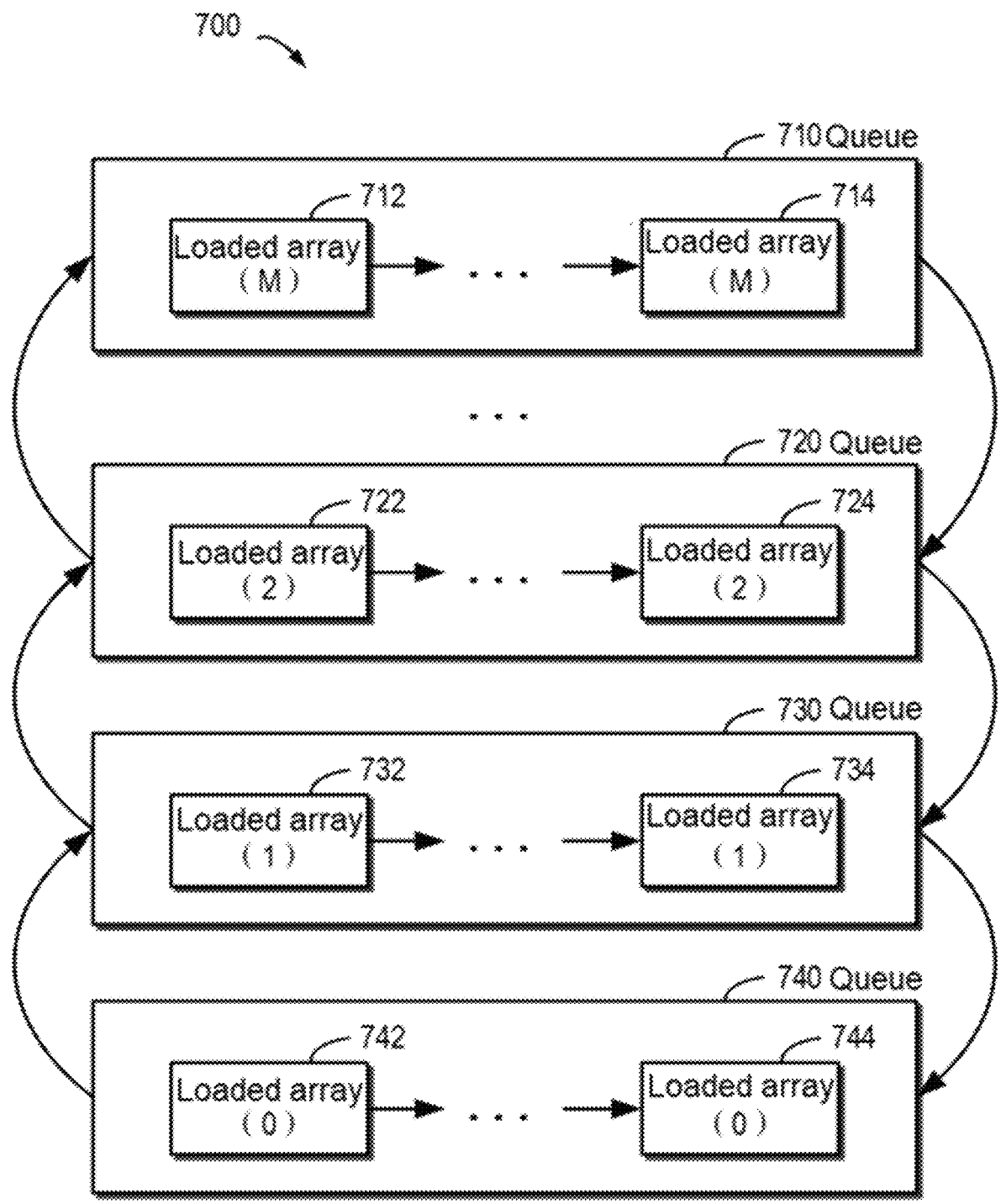
FIG. 7 schematically shows a block diagram of a process for managing a queue of a plurality of arrays loaded into a memory according to an implementation of the present disclosure.

According to an example implementation of the present disclosure, array sets of a plurality of groups may be managed based on a queue. Hereinafter, more details about the queue will be described with reference to FIG. 7. FIG. 7 schematically shows block diagram 700 of a process for managing a queue of a plurality of arrays loaded into a memory according to an implementation of the present disclosure. It has been described above that one or more arrays in the array set may be loaded into the memory based on the access popularity of data objects in a group. For a group, the number of arrays associated with the group which have been loaded into the memory may be used as the number of loaded arrays of the group.

For group 310, assuming that array set 320 includes three arrays and all three arrays have been loaded into the memory, the number of loaded queues of group 310 at this moment is 3. For group 316, assuming that array set 330 includes three arrays and only one array is loaded into the memory, the number of loaded queues of group 316 at this moment is 1. Then, based on the numbers of loaded arrays of a plurality of groups, the plurality of groups may be divided to a plurality of queues. Here, the number of loaded arrays of each group in each queue is the same.

Referring to FIG. 7, assuming that each array set includes m arrays, m+1 queues may be provided. For example, queue 710 may include loaded arrays of one or more groups, and the numbers in parentheses in each node 712, . . . , 714 in queue 710 indicate the number of arrays that have been loaded. Here, all arrays of the group correspond to node $712^m$ have been loaded into the memory, . . . , and all arrays of the group corresponding to node $714^m$ have been loaded into the memory. Similarly, queue 720 may include loaded arrays of one or more groups. Here, two array of the groups corresponding to nodes 722 and 724 have been loaded into the memory. One array of the groups corresponding to nodes 732 and 734 in queue 730 has been loaded into the memory.

None of the arrays of the groups corresponding to nodes 742 and 744 in queue 740 has been loaded into the memory.

With the example implementation of the present disclosure, the loaded arrays may be managed using different queues according to the number of loaded queues of the groups. In this way, the queues may run independently of each other, and thus the arrays loaded into the memory may be managed in a more convenient and effective manner.

According to an example implementation of the present disclosure, in a given queue, at least one group is sorted according to a time sequence in which data objects in the at least one group in the given queue are accessed. For example, a plurality of groups in the queue may be sorted based on a least-recently-used principle. With the example implementation of the present disclosure, a popularity of each group may be determined according to a time sequence in which data objects in each group are accessed. When the popularity of a group does not match the number of loaded arrays of the group, the number of loaded queues of the group may be adjusted to match the popularity of the group.

According to an example implementation of the present disclosure, if data objects in the given group have not been accessed for a long time, one or more arrays of the given group may be removed from the memory. Specifically, a threshold expiration time may be set. If a time period during which data objects in the given group are not accessed exceeds the threshold expiration time, the arrays associated with the given group are removed from the memory.

According to an example implementation of the present disclosure, a group access count may be set for each group GroupCount, and whenever a data object in a group is accessed, the group access count is increased by one. Further, a system access count Sys may be set for the entire storage system 110 SysCount, and whenever a data object in storage system 110 is accessed, the system access count is increased by one. Based on the comparison between the group access count and the system access count, the popularity of group access may be determined. According to an example implementation of the present disclosure, assuming that a plurality of data objects are divided toflgroups, values GroupCount and SysCount*n may be compared.

If GroupCount is less than SysCount*n, it indicates that the popularity of the group is lower than the popularity of the entire storage system. At this moment, one or more loaded arrays of the group should be removed from the memory. With the example implementation of the present disclosure, if data in a given group has not been accessed for a long time, the number of loaded queues of the given group is no longer suitable for the current popularity. In this way, by removing one or more arrays, the number of loaded queues for the given queue may be reduced, thereby saving storage space in the memory in the storage system.

If GroupCount is greater than SysCount*n, it indicates that the popularity of the group is higher than the popularity of the entire storage system. At this moment, one or more unloaded arrays of the group should be loaded into the memory. With the example implementation of the present disclosure, if data in a given group is accessed frequently, the number of loaded queues of the given group is no longer suitable for the current popularity. In this way, by loading one or more arrays, the number of loaded queues of the given queue may be increased, thereby reducing the false positive rate of a determination result. If GroupCount is equal to SysCount*n, the queue may be kept unchanged.

According to an example implementation of the present disclosure, if the popularity of a given group is increased, more arrays may be loaded into the memory. If the popularity of the given group is decreased, the loaded arrays in the memory may be removed. A threshold popularity may be predefined, and the threshold popularity may correspond to a specific value of the number of arrays that should be loaded. It is assumed that the popularity of the given group is increased to a certain threshold popularity, and the threshold popularity specifies that two arrays should be included in the memory. If only one array is currently loaded into the memory, another array should be loaded into the memory. It is assumed that the popularity of the given group is decreased to a certain threshold popularity, and the threshold popularity specifies that one array should be included in the memory. If two arrays are currently loaded into the memory, one of the arrays should be removed from the memory.

With the example implementation of the present disclosure, if more arrays are in the memory, the probability of hash collisions is lower, and thus the false positive rate in the determination result only based on a relatively low number of bloom filters may be reduced.

The management of groups with different numbers of loaded queues based on queues has been described above with reference to FIG. 7. At this moment, if the number of loaded queues of the given group is changed, the given group should be moved to another queue corresponding to the changed number. With continued reference to FIG. 7, assuming that node 724 in queue 720 is associated with a certain group and the number of loaded queues of the group is reduced from 2 to 1, node 724 should be moved from queue 720 to queue 730. For another example, assuming that node 734 in queue 730 is associated with a certain group and the number of loaded queues of the group is increased from 1 to 2, node 734 should be moved from queue 730 to queue 720.

With the example implementation of the present disclosure, it may be ensured that the number of loaded queues of each node in each queue is the same. In this way, it may be convenient to manage groups with similar popularity in the storage system.

According to an example implementation of the present disclosure, a plurality of queues as shown in FIG. 7 may be managed in various ways. Assuming that storage system 110 includes n groups, and a false positive rate indicator of the entire storage system 110 may be determined based on an access frequency of data objects in each group and the false positive rate related to the group. For example, the false positive rate indicator may be determined based on the following Formula 1:

$$\text{Metric} = \Sigma_{i=1}^{n} f_i \cdot f_{pi} \qquad \text{Formula 1}$$

where n indicates the number of groups, $f_i$ indicates i the access frequency for group No., and $f_{pi}$ indicates i the false positive rate of group No. When loading and removing arrays, Formula 1 may be used to ensure that the false positive rate indicator is not higher than the false positive rate based on the existing technical solution. With the example implementation of the present disclosure, it is possible to ensure that the false positive rate of the entire storage system 110 is maintained in an acceptable state.

The foregoing has described how to manage array sets of a plurality of groups based on a queue manner. Hereinafter, FIG. 4 will be referred to again for describing how to manage storage system 110 based on arrays in a memory. At block 440 of FIG. 4, storage system 110 is managed based on at least a part of the arrays in the memory. It will be understood that according to an example implementation of the present disclosure, by loading only a part of the arrays into the memory, it may be determined whether a certain target data object is included in storage system 110 based on bloom filters represented by the arrays. The management of storage system 110 may include two parts: a process of processing a storage request (i.e., storing a new target data object into the storage system); and a process of processing a search request (i.e., searching to see whether the storage system includes a certain target data object).

Figure 8:
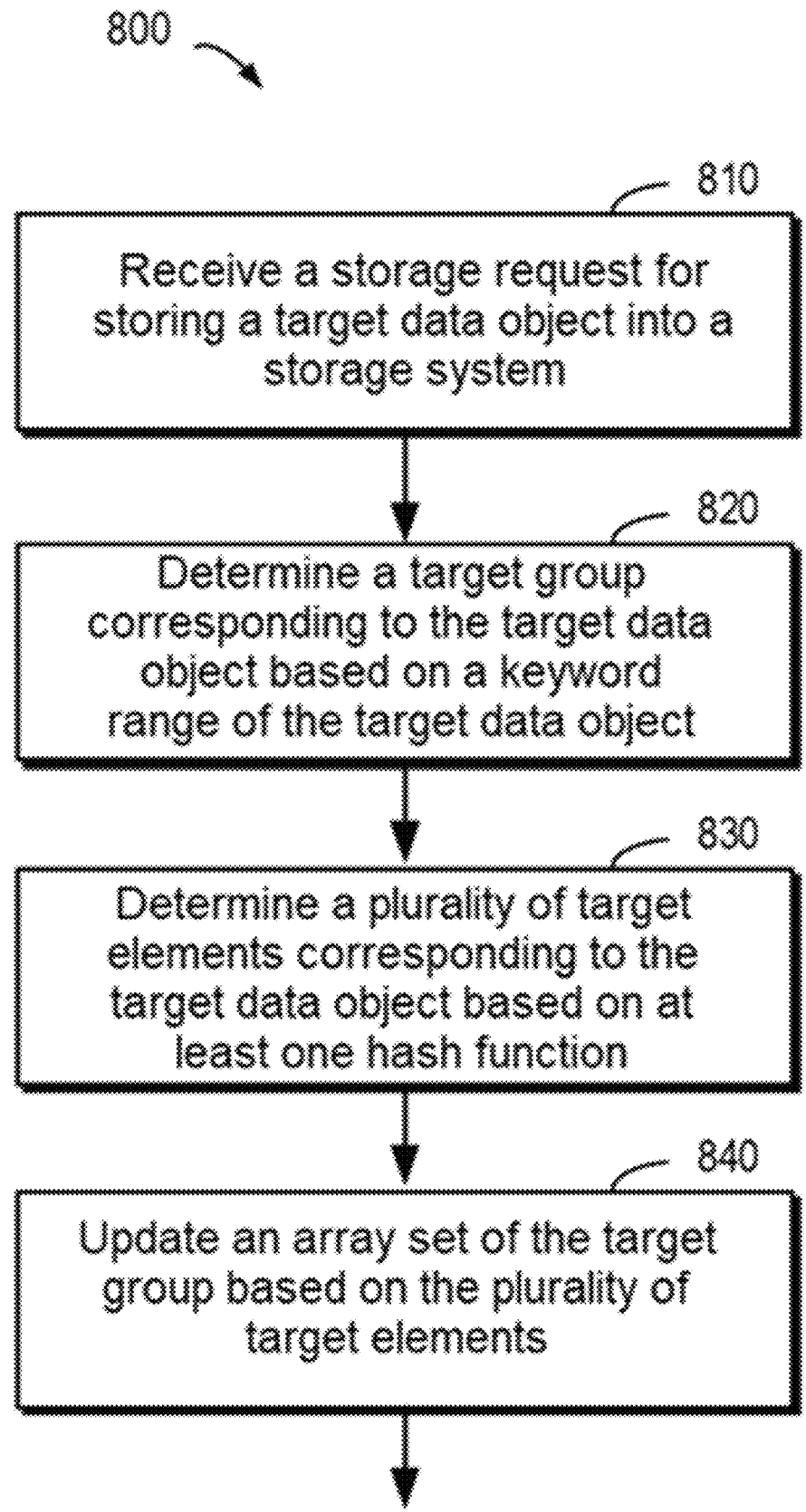
FIG. 8 schematically shows a flow chart of a method for storing a target data object into a storage system according to an implementation of the present disclosure.

First, referring to FIG. 8, the process of processing a storage request will be described. Specifically, FIG. 8 schematically shows a flow chart of method 800 for storing a target data object into storage system 110 according to an implementation of the present disclosure. At block 810, a storage request to store a target data object into storage system 110 is received. At block 820, a target group corresponding to the target data object in a plurality of groups is determined based on a keyword range of the target data object. Assuming that the keyword is "10," the target data object may be added to index node 230 as shown in FIG. 3, and at this moment, the target group is group 310.

At block 830, a plurality of target elements corresponding to the target data object are determined based on at least one hash function. For example, the corresponding target elements may be determined using hash functions 530 and 532, respectively, in a manner similar to that shown in FIG. 5. At block 840, an array set of the target group is updated based on the plurality of target elements. Specifically, various arrays in array set 320 may be updated using the plurality of elements determined at block 830.

With the example implementation of the present disclosure, when storing data objects into storage system 110, the values of bits in the array set corresponding to the stored data objects may be updated. The overhead of the operation is similar to the existing technical solution, and the burden on storage system 110 will not be increased. At this moment, the updated array set may reflect the latest state of storage system 110 and may serve future search requests, so as to reduce the memory resource overhead of the future search requests.

Figure 9:
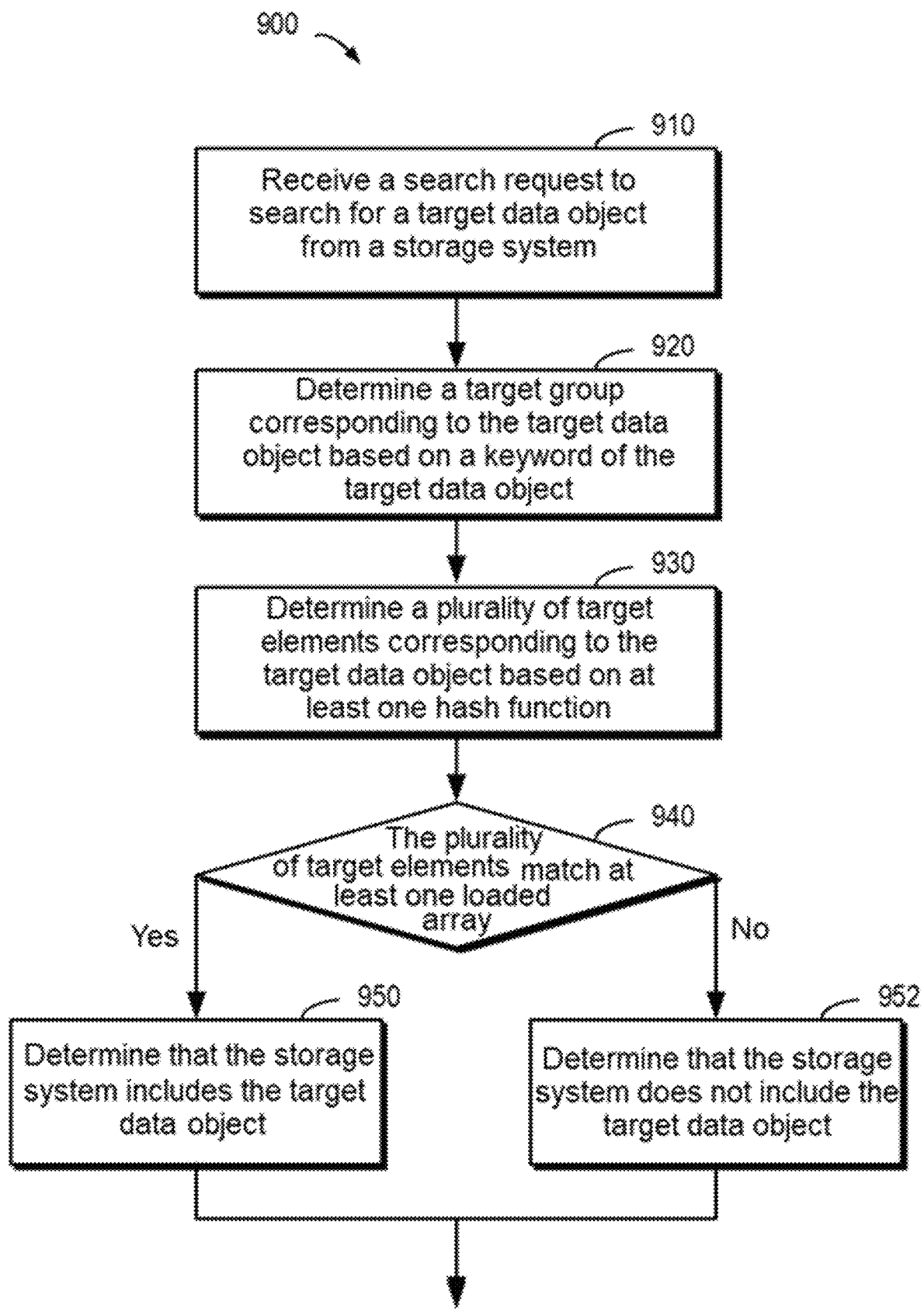
FIG. 9 schematically shows a flow chart of a method for searching for a target data object in a storage system according to an implementation of the present disclosure.

Referring to FIG. 9, the process of processing a search request will be described. Specifically, FIG. 9 schematically shows a flow chart of method 900 for searching for a target data object in a storage system according to an implementation of the present disclosure. At block 910, a search request to search for a target data object from storage system 110 is received. At block 920, a target group corresponding to the target data object is determined in a plurality of groups based on a keyword range of the target data object. Assuming that a request for searching for a target data object with a keyword "5" is received, it may be determined that the target group is group 310 as shown in FIG. 3.

At block 930, a plurality of target elements corresponding to the target data object are determined based on at least one hash function. At block 940, it is determined whether the plurality of target elements match at least a part of arrays of the target group loaded into the memory. If the determination result is yes, method 900 proceeds to block 950 to determine that the storage system includes the target data object. A data object with a keyword "5" is located in the storage system, and when the data object is stored in the storage system, corresponding bits (for example, the first bit and the second bit are set to 1) have been set in array 322 based on hash functions 530 and 532. At this moment, the plurality of target elements determined at block 930 match array 322 loaded into the memory, and thus it may be determined that the data object is stored in storage system 110.

If the determination result at block 940 is no, method 900 proceeds to block 952 to determine that the storage system does not include the target data object. For example, if a search request to search for a target data object with a keyword "11" is received, since storage system 110 does not include the target data object, a plurality of target elements determined based on the keyword 11 do not match at least one of the loaded arrays at this moment, and it may be determined that storage system 110 does not include the target data object with the keyword "11."

With the example implementation of the present disclosure, it may be determined whether the target data object is included in storage system 110 based on a simple comparison between the target element and at least one array that has been loaded. In this way, the overall performance of storage system 110 may be improved.

Examples of the method according to the present disclosure have been described in detail above with reference to FIGS. 2 to 8, and implementations of a corresponding apparatus will be described below. According to an example implementation of the present disclosure, an apparatus for managing a storage system is provided. The apparatus includes: a division module, configured to divide a plurality of data objects to a plurality of groups according to keyword ranges of the plurality of data objects in the storage system; a generation module, configured to generate array sets associated with groups in the plurality of groups respectively, an array in the array set including a plurality of elements, and the plurality of elements being set according to a keyword of at least one data object in the group and at least one hash function; a loading module, configured to load at least a part of the arrays in the plurality of array sets respectively associated with the plurality of groups into a memory of the storage system; and a management module, configured to manage the storage system based on at least a part of the arrays in the memory. According to an example implementation of the present disclosure, the apparatus further includes modules for performing other steps of the method described above.

Figure 10:
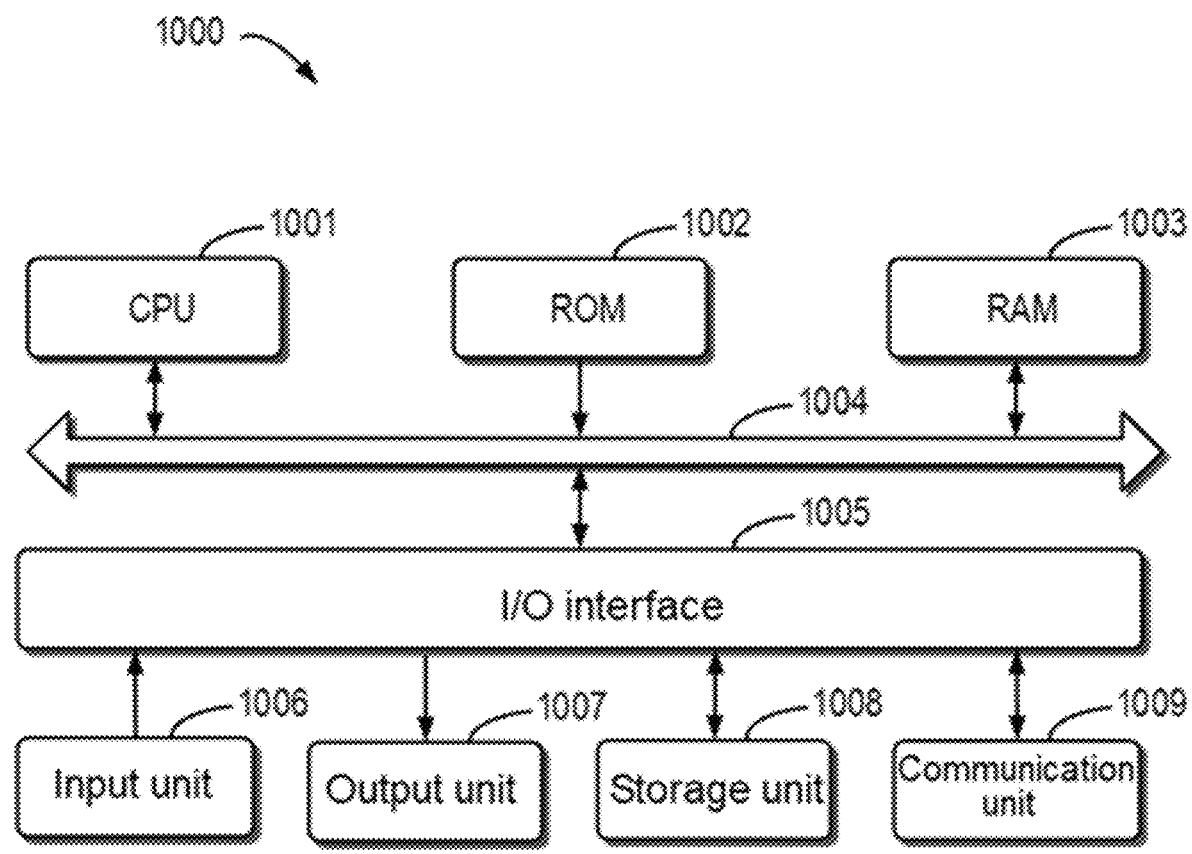
FIG. 10 schematically shows a block diagram of a device for managing a storage system according to an example implementation of the present disclosure.

FIG. 10 schematically shows a block diagram of device 1000 for managing a storage system according to an example implementation of the present disclosure. As shown in the figure, device 1000 includes central processing unit (CPU) 1001 that may perform various appropriate actions and processing according to computer program instructions stored in read-only memory (ROM) 1002 or computer program instructions loaded from storage unit 1008 into random access memory (RAM) 1003. In RAM 1003, various programs and data required for the operation of device 1000 can also be stored. CPU 1001, ROM 1002, and RAM 1003 are connected to each other via bus 1004. Input/output (I/O) interface 1005 is also connected to bus 1004.

A plurality of components in device 1000 are connected to I/O interface 1005, including: input unit 1006, such as a keyboard and a mouse; output unit 1007, such as various types of displays and speakers; storage unit 1008, such as a magnetic disk and an optical disc; and communication unit 1009, such as a network card, a modem, and a wireless communication transceiver. Communication unit 1009 allows device 1000 to exchange information/data with other devices over a computer network such as the Internet and/or various telecommunication networks.

The various processes and processing described above, such as methods 400, 800, and 900, may be performed by processing unit 1001. For example, in some implementations, methods 400, 800, and 900 may be implemented as a computer software program that is tangibly contained in a machine-readable medium, such as storage unit 1008. In some implementations, some or all of the computer program may be loaded and/or installed onto device 1000 via ROM 1002 and/or communication unit 1009. When the computer program is loaded to RAM 1003 and executed by CPU 1001, one or more steps of methods 400, 800, and 900 described above may be performed. Alternatively, in other implementations, CPU 1001 may also be configured in any other suitable manner to implement the above-mentioned processes/methods.

According to an example implementation of the present disclosure, an electronic device is provided. The electronic device includes: at least one processor; a volatile memory; and a memory coupled to the at least one processor. The memory has instructions stored therein. When executed by the at least one processor, the instructions cause the device to execute operations for managing a storage system. The operations include: dividing a plurality of data objects to a plurality of groups according to keyword ranges of the plurality of data objects in the storage system; generating array sets associated with groups in the plurality of groups respectively, an array in the array set including a plurality of elements, and the plurality of elements being set according to a keyword of at least one data object in the group and at least one hash function; loading at least a part of the arrays in the plurality of array sets respectively associated with the plurality of groups into a memory of the storage system; and managing the storage system based on at least a part of the arrays in the memory.

According to an example implementation of the present disclosure, dividing the plurality of data objects to the plurality of groups includes: acquiring indexes corresponding to the plurality of data objects in the storage system; and dividing the plurality of data objects to the plurality of groups based on a hierarchical structure of the indexes.

According to an example implementation of the present disclosure, loading at least a part of the arrays in the plurality of array sets respectively associated with the plurality of groups into the memory of the storage system includes: for a given group in the plurality of groups, determining an access popularity of the at least one data object in the given group; and loading at least a part of the arrays in the array set associated with the given group into the memory based on the popularity.

According to an example implementation of the present disclosure, the operations further include: determining numbers of loaded arrays of the plurality of groups respectively based on the numbers of arrays loaded into the memory and associated with the plurality of groups; and mapping the plurality of groups to a plurality of queues based on the numbers of loaded arrays of the plurality of groups, the number of loaded arrays of each group in a given queue in the plurality of queues being the same.

According to an example implementation of the present disclosure, the operations further include: sorting, according to a time sequence in which data objects in at least one group in the given queue are accessed, the at least one group in the given queue.

According to an example implementation of the present disclosure, the operations further include at least any one of the following: removing the arrays associated with the given group from the memory upon determining that a time period during which data objects in the given group are not accessed exceeds a threshold expiration time; and loading the unloaded arrays associated with the given group into the memory upon determining that the access popularity of the at least one data object in the given group is higher than a threshold popularity.

According to an example implementation of the present disclosure, the operations further include: moving the given group to another queue corresponding to the changed number upon determining that the number of loaded queues of the given group is changed.

According to an example implementation of the present disclosure, managing the storage system based on at least a part of the arrays in the memory includes: determining, upon determining that a search request to search for a target data object from the storage system is received, a target group corresponding to the target data object in the plurality of groups based on a keyword range of the target data object; determining a plurality of target elements corresponding to the target data object based on the at least one hash function; determining, in response to the determination that the plurality of target elements match at least a part of the arrays in the target group and loaded into the memory, that the storage system includes the target data object; and determining, in response to the determination that the plurality of target elements do not match at least a part of the arrays in the target group and loaded into the memory, that the storage system does not include the target data object.

According to an example implementation of the present disclosure, managing the storage system based on at least a part of the arrays in the memory includes: determining, upon determining that a storage request to store a target data object into the storage system is received, a target group corresponding to the target data object in the plurality of groups based on a keyword range of the target data object; determining a plurality of target elements corresponding to the target data object based on the at least one hash function; and updating the array set of the target group based on the plurality of target elements.

According to an example implementation of the present disclosure, the array is represented by a bloom filter, and the operations further include: determining an original length of an original bloom filter associated with the storage system; and determining the length and number of the plurality of arrays based on the original length and the number of groups.

According to an example implementation of the present disclosure, a computer program product is provided. The computer program product is tangibly stored on a non-transitory computer-readable medium and includes machine-executable instructions that are used to implement the method according to the present disclosure.

According to an example implementation of the present disclosure, a computer-readable medium is provided. The computer-readable medium stores machine-executable instructions that, when executed by at least one processor, cause the at least one processor to implement the methods according to the present disclosure.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used here is not construed as transient signals themselves, such as radio waves or other freely propagating electromagnetic waves, electromagnetic waves propagating through waveguides or other transmission media (e.g., optical pulses through fiber-optic cables), or electrical signals transmitted through electrical wires.

The computer-readable program instructions described herein can be downloaded from a computer-readable storage medium to various computing/processing devices, or downloaded to an external computer or external storage device via a network such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the "C" language or similar programming languages. The computer-readable program instructions can be completely executed on a user's computer, partially executed on a user's computer, executed as a separate software package, partially executed on a user's computer and partially executed on a remote computer, or completely executed on a remote computer or a server. In cases where a remote computer is involved, the remote computer can be connected to a user's computer over any kind of networks, including a local area network (LAN) or a wide area network (WAN), or can be connected to an external computer (e.g., over the Internet by using an Internet service provider). In some implementations, an electronic circuit, for example, a programmable logic circuit, a field programmable gate array (FPGA), or a programmable logic array (PLA), is personalized by utilizing state information of computer-readable program instructions, and the electronic circuit may execute the computer-readable program instructions so as to implement various aspects of the present disclosure.

Various aspects of the present disclosure are described herein with reference to flowcharts and/or block diagrams of the method, the apparatus (system), and the computer program product according to implementations of the present disclosure. It should be understood that each block of the flowcharts and/or block diagrams and combinations of blocks in the flowcharts and/or block diagrams can be implemented by computer-readable program instructions.

These computer-readable program instructions may be provided to a processing unit of a general-purpose computer, a special-purpose computer, or another programmable data processing apparatus, thereby producing a machine, such that these instructions, when executed by the processing unit of the computer or another programmable data processing apparatus, produce a means for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner, such that the computer-readable medium having instructions stored includes an article of manufacture that includes instructions for implementing various aspects of the functions/actions specified in one or more blocks in the flowcharts and/or block diagrams.

The computer-readable program instructions can also be loaded onto a computer, another programmable data processing apparatus, or another device, so that a series of operating steps can be performed on the computer, another programmable data processing apparatus, or another device to produce a computer-implemented process. Therefore, the instructions executed on the computer, another programmable data processing apparatus, or another device implement the functions/actions specified in one or more blocks in the flowcharts and/or block diagrams.

The flowcharts and block diagrams in the accompanying drawings illustrate the architectures, functions, and operations of possible implementations of systems, methods, and computer program products according to multiple implementations of the present disclosure. In this regard, each block in the flowcharts or block diagrams may represent a module, a program segment, or a part of an instruction that contains one or more executable instructions for implementing specified logical functions. In some alternative implementations, functions labeled in the blocks may also occur in an order different from that labeled in the accompanying drawings. For example, two successive blocks may actually be performed basically in parallel, or they may be performed in an opposite order sometimes, depending on the functions involved. It should also be noted that each block in the block diagrams and/or flowcharts and a combination of blocks in the block diagrams and/or flowcharts can be implemented using a dedicated hardware-based system for executing specified functions or actions, or can be implemented using a combination of dedicated hardware and computer instructions.

Various implementations of the present disclosure have been described above. The above description is illustrative but not exhaustive, and is not limited to the various implementations disclosed. Multiple modifications and variations will be apparent to those of ordinary skill in the art without departing from the scope and spirit of the illustrated various implementations. The selection of terms as used herein is intended to best explain the principles and practical applications of the various implementations or the improvements to technologies on the market, or to enable other persons of ordinary skill in the art to understand the implementations disclosed here.

The invention claimed is:

1. A method, comprising:
acquiring, by a system comprising a processor, indexes corresponding to a plurality of data objects in a storage system;

dividing, by the system the plurality of data objects to a plurality of groups according to keyword ranges of the plurality of data objects in the storage system, and based on a hierarchical structure of the indexes;

generating, by the system, array sets associated with groups in the plurality of groups respectively, the array sets comprising arrays, an array in the array sets comprising a plurality of elements, the plurality of elements being set according to a keyword of at least one data object in the groups and at least one hash function;

loading, by the system, at least a part of the arrays in the array sets respectively associated with the plurality of groups into a memory of the storage system; and managing, by the system, the storage system based on at least the part of the arrays in the memory.

2. The method according to claim 1, wherein loading at least the part of the arrays in the array sets respectively associated with the plurality of groups into the memory of the storage system comprises: for a given group in the plurality of groups, determining, by the system, an access popularity of the at least one data object in the given group; and loading, by the system, at least a part of the arrays in the array sets associated with the given group into the memory based on the access popularity.

3. The method according to claim 2, further comprising:

determining, by the system, numbers of loaded arrays of the plurality of groups respectively based on numbers of the arrays loaded into the memory and associated with the plurality of groups; and mapping, by the system, the plurality of groups to a plurality of queues based on respective numbers of loaded arrays of the plurality of groups, a number of loaded arrays of each group in a given queue in the plurality of queues being the same.

4. The method according to claim 3, further comprising:

sorting, by the system and according to a time sequence in which data objects in at least one group in the given queue are accessed, the at least one group in the given queue.

5. The method according to claim 3, further comprising at least any one of:

removing, by the system, the arrays associated with the given group from the memory upon determining that a time period during which data objects in the given group are not accessed exceeds a threshold expiration time; and loading, by the system, unloaded arrays associated with the given group into the memory upon determining that the access popularity of the at least one data object in the given group is higher than a threshold popularity.

6. The method according to claim 5, further comprising:

moving, by the system, the given group to another queue corresponding to changed number upon determining that a number of loaded queues of the given group is changed to the changed number.

7. The method according to claim 1, wherein managing the storage system based on at least the part of the arrays in the memory comprises:

determining, by the system and upon determining that a search request to search for a target data object from the storage system is received, a target group corresponding to the target data object in the plurality of groups based on a keyword range of the target data object;

determining, by the system, a plurality of target elements corresponding to the target data object based on the at least one hash function;

determining, by the system and in response to determining that the plurality of target elements match at least a part of arrays in the target group loaded into the memory, that the storage system comprises the target data object; and determining, by the system and in response determining that the plurality of target elements do not match at least the part of the arrays in the target group loaded into the memory, that the storage system does not comprise the target data object.

8. The method according to claim 1, wherein managing the storage system based on at least the part of the arrays in the memory comprises:

determining, by the system and upon determining that a storage request to store a target data object into the storage system is received, a target group corresponding to the target data object in the plurality of groups based on a keyword range of the target data object;

determining, by the system, a plurality of target elements corresponding to the target data object based on the at least one hash function; and updating, by the system, an array set of the target group based on the plurality of target elements.

9. The method according to claim 1, wherein the array is represented by a bloom filter, and the method further comprises:

determining, by the system, an original length of an original bloom filter associated with the storage system; and determining, by the system, a length and a number of the array sets based on the original length and a number of groups of the plurality of groups.

10. An electronic device, comprising:

at least one processor;

a volatile memory; and a memory coupled to the at least one processor and having instructions stored therein, wherein the instructions, when executed by the at least one processor, cause the electronic device to perform operations, comprising:

acquiring indexes corresponding to a plurality of data objects in a storage system;

dividing the plurality of data objects to a plurality of groups according to keyword ranges of the plurality of data objects in the storage system, and based on a hierarchical structure of the indexes;

generating array sets associated with groups in the plurality of groups respectively, the array sets comprising arrays, an array in the array sets comprising a plurality of elements, and the plurality of elements being set according to a keyword of at least one data object in the groups and at least one hash function;

loading at least a part of the arrays in the array sets respectively associated with the plurality of groups into a memory of the storage system; and managing the storage system based on at least the part of the arrays in the memory of the storage system.

11. The electronic device according to claim 10, wherein loading at least the part of the arrays in the array sets respectively associated with the plurality of groups into the memory of the storage system comprises: for a given group in the plurality of groups, determining an access popularity of the at least one data object in the given group; and loading at least the part of the arrays in the array sets associated with the given group into the memory based on the access popularity.

12. The electronic device according to claim 11, wherein the operations further comprise:
determining numbers of loaded arrays of the plurality of groups respectively based on numbers of the arrays loaded into the memory and associated with the plurality of groups; and
mapping the plurality of groups to a plurality of queues based on respective numbers of loaded arrays of the plurality of groups, a number of loaded arrays of each group in a given queue in the plurality of queues being the same.

13. The electronic device according to claim 12, wherein the operations further comprise:
sorting, according to a time sequence in which data objects in at least one group in the given queue are accessed, the at least one group in the given queue.

14. The electronic device according to claim 12, wherein the operations further comprise at least any one of:
removing the arrays associated with the given group from the memory upon determining that a time period during which data objects in the given group are not accessed exceeds a threshold expiration time; and
loading unloaded arrays associated with the given group into the memory upon determining that the access popularity of the at least one data object in the given group is higher than a threshold popularity.

15. The electronic device according to claim 14, wherein the operations further comprise:
moving the given group to another queue corresponding to a changed number upon determining that a number of loaded queues of the given group is changed to the changed number.

16. The electronic device according to claim 10, wherein managing the storage system based on at least the part of the arrays in the memory comprises:
determining, upon determining that a search request to search for a target data object from the storage system is received, a target group corresponding to the target data object in the plurality of groups based on a keyword range of the target data object;
determining a plurality of target elements corresponding to the target data object based on the at least one hash function;
determining, in response to determining that the plurality of target elements match at least a part of arrays in the target group loaded into the memory, that the storage system comprises the target data object; and
determining, in response to determining that the plurality of target elements do not match at least the part of the arrays in the target group loaded into the memory, that the storage system does not comprise the target data object.

17. The electronic device according to claim 10, wherein managing the storage system based on at least the part of the arrays in the memory comprises:
determining, upon determining that a storage request to store a target data object into the storage system is received, a target group corresponding to the target data object in the plurality of groups based on a keyword range of the target data object;
determining a plurality of target elements corresponding to the target data object based on the at least one hash function; and
updating an array set of the target group based on the plurality of target elements.

18. A computer program product tangibly stored on a non-transitory computer-readable medium and comprising machine-executable instructions, wherein the machine-executable instructions are used to implement operations, comprising:
acquiring indexes corresponding to a plurality of data objects in a storage system;
dividing the plurality of data objects to a plurality of groups according to keyword ranges of the plurality of data objects in the storage system, and based on a hierarchical structure of the indexes;
generating array sets associated with groups in the plurality of groups respectively, the array sets comprising arrays, an array in the array sets comprising a plurality of elements, the plurality of elements being set according to a keyword of at least one data object in the groups and at least one hash function;
loading at least a part of the arrays in the plurality of array sets respectively associated with the plurality of groups into a memory of the storage system; and
managing the storage system based on at least the part of the arrays in the memory.

19. The computer program product according to claim 18, wherein managing the storage system based on at least the part of the arrays in the memory comprises:
determining, upon determining that a search request to search for a target data object from the storage system is received, a target group corresponding to the target data object in the plurality of groups based on a keyword range of the target data object;
determining a plurality of target elements corresponding to the target data object based on the at least one hash function;
determining, in response to determining that the plurality of target elements match at least a part of arrays in the target group loaded into the memory, that the storage system comprises the target data object; and
determining, in response to determining that the plurality of target elements do not match at least the part of the arrays in the target group loaded into the memory, that the storage system does not comprise the target data object.

20. The computer program product according to claim 18, wherein managing the storage system based on at least the part of the arrays in the memory comprises:
determining, upon determining that a storage request to store a target data object into the storage system is received, a target group corresponding to the target data object in the plurality of groups based on a keyword range of the target data object;
determining a plurality of target elements corresponding to the target data object based on the at least one hash function; and
updating an array set of the target group based on the plurality of target elements.

* * * * *